Sept. 8, 1953  F. B. CASEY ET AL  2,651,350
PACKAGING MACHINE
Original Filed Nov. 26, 1947

Inventors
Francis B. Casey
Robert R. Woodcock
Manson E. Wood
By Theodore C. Browne
Attorney Patented Sept. 8, 1953

2,651,350

UNITED STATES PATENT OFFICE 2,651,350

PACKAGING MACHINE

Francis B. Casey, Concord, Robert Reed Woodcock, Weymouth, and Manson E. Wood, Wakefield, Mass., assignors to Dewey and Almy Chemical Company, Cambridge, Mass., a corporation of Massachusetts Original application November 26, 1947, Serial No. 788,262. Divided and this application December 6, 1949, Serial No. 131,418

1 Claim. (Cl. 154—42)

This application is a division of patent application Ser. No. 788,262, filed November 26, 1947. In the parent application a machine was disclosed capable of removing air from filled bags formed of heat-sealable sheet or tube material and then sealing the bag in an hermetic manner by heat and pressure.

Claims in the parent application are directed to the machine itself. The present application is directed to the heat-sealing means which are used on the machine as described in the parent application, but which also are capable of use on other forms of sealing apparatus where a dependable heat-sealed hermetic closure is desired.

In sealing the open mouth of bags made of thin films of a heat-sealable substance, one serious difficulty has been improper sealing if the film happened to be creased or folded as the mouth of the bag was laid across the sealing jaws. If the bag is composed of a truly thermoplastic substance, the concentration of pressure on the ridge causes the material to flow excessively at the moment of sealing. The result is a spotty seal which frequently leaks, but more frequently is mechanically weak.

This spotty, localized thinning of the bag substance adjacent the fused seal may be prevented by making the support or "anvil" member flexible and distortable as, for example, making the anvil out of rubber, but immediately new troubles occur, chief of which is an overall weakening of the seal.

The specific object of this invention is to devise means for sealing a heat-sealable bag in an hermetic manner whether or not a fold or other irregularity of the thickness of the material in the area to be sealed is present and to devise means which prevent the heat-sealing jaws from weakening or tearing the bag as the jaws close.

Essentially, the machine described in the parent application consists of a suitable support for the bag and its contents, an evacuating nozzle over which the mouth of the bag is pushed during evacuation and a pair of sealing jaws arranged to engage opposite sides of the neck of the bag in front of the evacuating nozzle to heat seal the bag.

In our investigation of the cause of weak seals made with conventional sealing apparatus, we discovered that although one would expect that the heat derived from a single, hot sealing jaw would strike through the thin material of the bag so quickly that there would be no significant difference in the physical condition of the film in the top and bottom layers of the bag at the moment of sealing, the cold opposing jaw chilled the layer in contact with it. The result is that one wall of the bag is plastic and flowable while the other wall is still relatively rigid. This effect concentrates the plastic flow during sealing to the hotter wall of the bag and produces a "one-sided," weakened seal. We discovered also that if "one-sided" seals were to be avoided, the development of plasticity in both walls of the bag in the area to be sealed should progress approximately at the same rate. We accomplish the desired result and produce well sealed bags by heating both sealing jaws and by providing that at least one of the sealing bars be hot and flexible and distortable when sealing is performed. In practice, the surface temperatures of the upper and lower bars are kept approximately equal.

Figure 1:
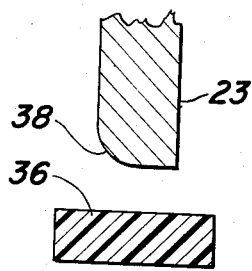
Figure 1 is a sectional detail through the two actual sealing members.

Referring to the drawings, the machine is provided with a supporting frame constructed generally as a rectangular box-like frame 10 having a table surface 11 formed at the top thereof. Preferably, the frame 10 is formed of angle irons arranged along the various corners of the boxlike frame and secured together in any suitable manner. Adjustable foot pieces 12 are arranged at the four lower corners of the frame 10 and maintain the frame in spaced relation with respect to the floor or supporting surface.

A lower sealing jaw 13 is supported on the table surface 11, and a movable sealing jaw, represented generally at 14, is arranged above the stationary jaw 13 and is mounted for vertical reciprocation on a movable frame having two vertical sides formed of two tubular members 15 and 16 having threaded engagement at their lower ends with vertical rods 17 and 18. A horizontal cross bar 19 in the form of an inverted channel iron extends between the vertical rods 17 and 18.

Figure 3:
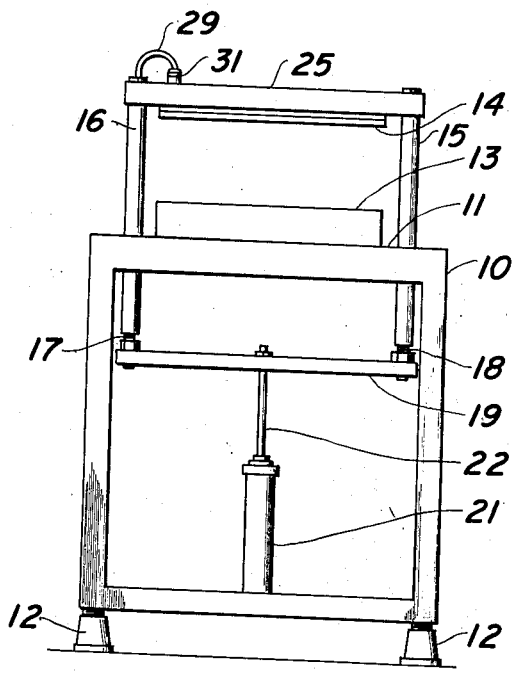
Figure 3 is a diagrammatic elevation of the sealing machine.

Mounted immediately below the center of the cross bar 19 is an operating cylinder 21, such as a pneumatic cylinder, having a piston connected to the center of the bar 19 by a connecting rod 22. The upper sealing jaw 14 is mounted across the upper ends of tubular members 15 and 16. By suitably energizing the cylinder 21, the sliding frame carrying the movable sealing jaw 14 may be reciprocated vertically between the open position shown in Figure 3 to a lower or sealing position where the movable jaw 14 engages the lower stationary jaw 13.

Figure 2:
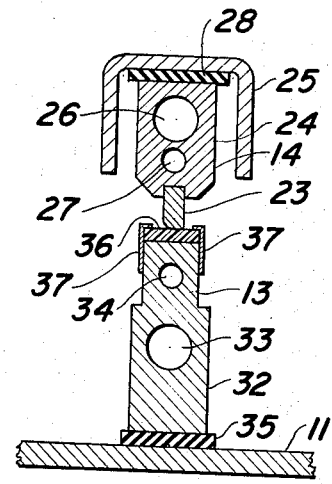
Figure 2 is a section through both sealing jaws.

Both the upper and lower sealing jaws of the machine described are heated and the preferred arrangement is illustrated in Figure 2. The upper jaw 14 is formed of a metallic bar 23 mounted in larger metallic bar 24 supported by an inverted channel bar 25 mounted at opposite ends on tubular members 15 and 16. The bar 24 is heated by suitable electric heater units arranged within the bore 26 and is maintained at a predetermined temperature by a thermostatic element mounted within the bore 27. A strip or bar 28 of heat insulating material, such as asbestos, is interposed between the heated bar 24 and the channel bar 25 to prevent loss of heat.

Electric current for heating jaw 14 is supplied by a cable 29 which passes upwardly through tubular member 16 to a connector 31 carried by channel bar 25. The lower sealing jaw is formed of a metallic bar 32 heated by suitable electric units positioned in bore 33 and controlled by a thermostatic element positioned in bore 34. A heat insulating strip 35 is interposed between the bar 32 and the table 11 to prevent loss of heat through the table.

The actual sealing surface of the lower jaw is formed from a strip of heat-resistant, yieldable or springy material 36, such as silicone rubber reinforced with glass fiber, arranged on the upper edge of the bar 32 and held in position by a pair of clamping angle pieces 37 secured on opposite sides of the bar 32. The yieldable sealing strip provides a cushioning effect to seal across any creases or folds which are found in the neck of the bag. The springiness of the strip makes it possible to seal the thin sections between folds without using excessive pressure which would cut through the folded portions. The silicone rubber strip is also useful in the sealing of thermoplastics which become sticky at sealing temperatures, since it prevents sticking of the material to the jaw, and the fact that it is heated approximately to the same temperature as jaw 14 prevents a one-sided weakening of the seal.

We also found when the bag was filled with material and its neck was laid on the lower sealing jaw 13, the presence of material in the bag caused the walls of the bag to come together from spaced points so that at the moment of sealing, the bag walls approached each other as a rather open V. At the same time, the downward travel of the upper sealing jaw 14 stretched the plastic bag material in contact with the upper bar and thinned it thus weakening the seal. We found that by rounding the inner edge of the upper bar 23 to form a radius 38, a sharp heated line is not formed as the jaw 14 descends upon the thermoplastic material and much less strain is imposed and a seal can be formed without producing a strip of thinned and weakened thermoplastic material on the contents side of the seal immediately adjacent the heat seal. As shown in Figure 1, the inner front edge of sealing bar 23 is rounded to prevent such a squeezing out and thinning down of the bag material under the heat-sealing pressure. The sharp right-angle corner on the outer side of the bar allows the bag surplus to be torn off cleanly when the material is hot and plastic from the sealing operation. Guard plates are arranged on opposite sides of the lower sealing jaw to prevent burning of the hands of the operator by the jaw.

The operation of the machine will be summarized as follows: When the bag has been filled with the material to be packaged the neck of the bag is placed between the resilient heated lower jaw 13 and the heated upper jaw 14. The operator then actuates a control which moves the upper jaw into sealing position with the neck of the bag. Substantially a uniform pressure is built up on the interposed thermoplastic material of the bag and no over pressures occur which cause the heated thermoplastic material to thin, flow and weaken the sealed portion of the bag.

The seals which are formed by this apparatus are quite uniform, and will stand approximately the same strain as will the walls of the bag.

We claim:

In a machine for heat sealing filled bags of thermoplastic material, the combination of a heated flexible support member providing a resilient yieldable anvil surface and a movable heated sealing jaw formed of good heat-conducting property and adapted to close upon said anvil surface and to heat seal thermoplastic material interposed between said sealing jaw and said anvil surface, means for heating both jaws, the sealing surface of said sealing jaw and of said support member being flat and mutually parallel in the sealing position, one margin of said sealing jaw merging into the vertical face of said jaw as a radius facing the bag, said radius being of sufficient dimensions that no portion of the bag contacts a substantially discontinuous surface of said sealing jaw as the jaw closes to form a seal whereby the heat imparted by the sealing jaw to the thermoplastic bag material is graduated from the bag to the sealed area and an area of thinned and weakened thermoplastic material on the bag side of the seal immediately adjacent the sealed area is avoided, and the other margin of said sealing jaw lying along a rectangular intersection of the sealing face with the other vertical face of said sealing jaw.

FRANCIS B. CASEY.
ROBERT REED WOODCOCK.
MANSON E. WOOD.

References Cited in the file of this patent

UNITED STATES PATENTS

| Number | Name | Date |
|---|---|---|
| 1,953,122 | Munson | Apr. 3, 1934 |
| 2,213,744 | Robertson | Sept. 3, 1940 |
| 2,258,218 | Rochow | Oct. 7, 1941 |
| 2,289,618 | Young | July 14, 1942 |
| 2,340,510 | Corely et al. | Feb. 1, 1944 |
| 2,390,550 | Moore | Dec. 11, 1945 |
| 2,433,176 | Van Epps | Dec. 23, 1947 |
| 2,473,552 | Staw | June 21, 1949 |
| 2,479,375 | Langer | Aug. 16, 1949 |
| 2,484,076 | Collins | Oct. 11, 1949 |
| 2,509,439 | Langer | May 30, 1950 |